3,062,613
PROCESS OF SEPARATING TANTALUM AND COLUMBIUM VALUES

Roger L. Pilloton, Niagara Falls, and George E. Crawley, Jr., Tonawanda, N.Y., assignors to Union Carbide Corporation, a corporation of New York
No Drawing. Filed Nov. 17, 1959, Ser. No. 853,473
14 Claims. (Cl. 23—23)

This invention relates to a process for recovering tantalum values from aqueous solutions and, more specifically, to a process for the separation of tantalum values from columbium values by solvent extraction techniques.

Heretofore, the separation of tantalum from columbium, with which it is normally mineralogically combined, has been accomplished by a relatively tedious and lengthy series of fractional crystallizations or by adsorption on a suitable ion exchange medium with subsequent elution. More recent methods employ, instead, a solvent extraction operation wherein the tantalum and columbium values are dissolved in an aqueous solution containing a mixture of hydrofluoric acid and another mineral acid, such as sulfuric acid, nitric acid, hydrochloric acid or perchloric acid. This aqueous acid solution is, subsequently, contacted with an organic solvent, such as a ketone, which extracts from the solution the tantalum values preferentially, leaving in the aqueous solution a high percentage of the columbium values.

In this relatively new field of extractive metallurgy, however, there appears to be a need for improvements in the procedural operations, in the quality and yield of the extracted materials, and in the economy of the process itself.

Accordingly, it is the main object of the present invention to provide an improved method for separating tantalum values from columbium values admixedly dissolved in aqueous hydrofluoric acid solution whereby the tantalum is recovered in considerably greater quantities and in substantially purer form than was previously possible.

Other objects and advantages of the present invention will be apparent from a description of the invention and from the appended claims.

The process which satisfies the objects of the invention comprises providing an aqueous solution of hydrofluoric acid containing the dissolved tantalum and columbium values; adding determined amounts of a soluble silicon salt and of a fluoride salt so that the molar ratio of the combined tantalum and columbium present in the solution, expressed as $Ta_2O_5$ and $Cb_2O_5$, respectively, to the added soluble silicon, expressed as $SiO_2$, is from about 0.5 to about 6 and the atomic ratio of the fluorine to the silicon in the solution is from about 2 to about 10; correcting the acidity of the solution to produce a solution having a hydrogen ion concentration corresponding to a pH of from about 0.5 to about 4; contacting said solution with a substantially water-immiscible organic solvent selected from the group consisting of lower aliphatic ketones and lower aliphatic esters, whereby tantalum values are transferred from the aqueous solution to the organic solvent; and separating the pregnant organic solvent from the aqueous solution.

Following this procedure, substantially all of the tantalum is transferred to the organic solvent in a very pure state, the columbium and other impurities originally present in the starting material remaining in the aqueous phase.

It is well known that substantially complete dissolution of the tantalum and columbium values in an aqueous acidic solution may be achieved by contacting said tantalum and columbium values with an aqueous solution of hydrofluoric acid having a concentration of hydrogen fluoride of from about 10 percent to about 85 percent. Very satisfactory results are normally attained by employing an aqueous solution of hydrofluoric acid which contains an acid concentration of about 50 percent.

The soluble silicon and the soluble fluoride salts may be added to the aqueous acid solution as independent salts, for example, as a combination of a silicate and a fluoride salt. However, the silicon and the fluoride are more conveniently and more effectively added in the form of a double salt of silicon. For instance, $H_2SiF_6$, $Na_2SiF_6$ and $K_2SiF_6$ have been found to be extremely efficient and valuable.

The quantity of the selected silicofluoride salt to be added to the aqueous acidic solution is closely related to the molar concentration of the combined tantalum and columbium values in the solution and is determined by the required molar ratio of the combined tantalum and columbium oxide to the silicon dioxide content in solution. Said ratio has been experimentally found to be in the range of from about 0.5 to about 6 moles of tantalum plus columbium values, expressed as $Ta_2O_5$ and $Cb_2O_5$, per mole of silicon, expressed as $SiO_2$. Excellent results have been obtained when the ratio of tantalum plus columbium, expressed as $Ta_2O_5$ and $Cb_2O_5$, to silicon, expressed as $SiO_2$, was approximately three.

If the silicon is added in molar quantities smaller than the above-mentioned ratio ranges the separation of Cb from Ta by liquid extraction loses considerably its efficiency and, conversely, if the silicon is added in excessive molar quantities, namely, greater than the above-mentioned ratio ranges, there is a danger of contamination of the Cb and Ta oxide with $SiO_2$ and of difficulties in the recovery and filtration of these oxides.

Although generally speaking any strong base can offset and counteract an acid solution, the bases which have been found suitable for correcting the pH of the solution to values of from approximately 0.5 to approximately 4 include calcium hydroxide, calcium oxide, sodium hydroxide, potassium hydroxide, sodium carbonate, potassium carbonate, potassium oxide, sodium oxide, ammonia and ammonium hydroxide.

A solution with a pH of two has been found to result in an extraction operation most efficient and complete. However, satisfactory results may be obtained by extracting the tantalum values from a solution which has a pH value of from about 0.5 to about 4.

Organic extracting solvents which have been found to be suitable for use in the process of this invention are the substantially water-immiscible lower aliphatic ketones and the lower aliphatic esters, especially methyl isobutyl ketone, di-isobutyl ketone, butyl formate and propyl acetate.

Further details of the process of this invention will be apparent from the following example:

EXAMPLE

To an aqueous solution of 165 milliliters of 50 percent hydrofluoric acid were added 67.3 grams of tantalum pentoxide, 19.8 grams of columbium pentoxide and 20.0 grams of calcium hydroxide. The solution was then thoroughly mixed and filtered and the precipitate was discarded since it contained undesirable contaminants. The remaining solution, measuring 130 milliliters, had a specific gravity of 1.395 and contained 15.45 percent by weight tantalum pentoxide and 1.125 percent by weight columbium pentoxide. Approximately one-half of said solution, namely, 65 milliliters was not treated with a silico-fluoride salt but contacted directly with an equal volume, namely, 65 milliliters of methyl isobutyl ketone, shaken for thirty minutes, allowed to stand for sixty additional minutes until the organic phase was wholly separated from the aqueous phase and, finally, separated and analyzed. An identical quantity of said original solution, namely, 65 milliliters, was treated with 4 milliliters of an aqueous solution containing 30 percent by weight of $H_2SiF_6$ and with 69 milliliters of methyl isobutyl ketone, shaken for thirty minutes, allowed to stand for sixty additional minutes until distinct aqueous and organic phases formed. The two phases were subsequently separated and analyzed. The following table shows the results obtained in the two cases:

Table

|  | Without $H_2SiF_6$ | With $H_2SiF_6$ |
|---|---|---|
| Aqueous phase: |  |  |
|   Milliliters | 49 | 53 |
|   Specific gravity | 1.22 | 1.22 |
| Organic phase: |  |  |
|   Milliliters | 77 | 83 |
|   Specific gravity | 1.025 | 1.033 |
| Ratio of tantalum to columbium: |  |  |
|   In aqueous phase | 1.8 | 1.4 |
|   In organic phase | 200 | 400 |
| Separation factor $\dfrac{\left(\frac{Ta}{Cb}\right) \text{org.}}{\left(\frac{Ta}{Cb}\right) \text{aq.}}$ | 111 | 285 |

While a preferred embodiment of the invention was herein described, it should be understood that the foregoing example is merely illustrative of, and not limitative upon, the invention and that the details given herein may be modified within the scope of the appended claims.

What is claimed is:

1. A process for separating tantalum values from columbium values which comprises providing a solution of said tantalum and columbium values in aqueous hydrofluoric acid; adding to said solution a soluble salt of silicon and a soluble fluoride salt in such amount that the molar ratio of the combined tantalum and columbium in the solution, expressed as $Ta_2O_5$ and $Cb_2O_5$, respectively, to the added soluble silicon, expressed as $SiO_2$, is from about 0.5 to about 6 and the atomic ratio of the fluorine to the silicon in solution is from about 2 to about 10; correcting the acidity of the solution to a pH of from about 0.5 to about 4; contacting the pH-corrected solution with a substantially water-immiscible organic solvent selected from the group consisting of lower aliphatic ketones and lower aliphatic esters, whereby tantalum values are transferred from the aqueous solution to the organic solvent; and separating the pregnant organic solvent from the aqueous solution, thereby separating substantially all of the tantalum value from the columbium value and from other impurities.

2. The process of claim 1 in which the soluble salt of silicon and the soluble fluoride salt are selected from the group consisting of hydrogen silicohexafluoride ($H_2SiF_6$), sodium silicohexafluoride ($Na_2SiF_6$) and potassium silicohexafluoride ($K_2SiF_6$).

3. The process of claim 1 in which the substantially water-immiscible organic solvent is selected from the group consisting of methyl isobutyl ketone, di-isobutyl ketone, butyl formate and propyl acetate.

4. The process of claim 2 in which the substantially water-immiscible organic solvent is selected from the group consisting of methyl isobutyl ketone, di-isobutyl ketone, butyl formate, and propyl acetate.

5. The process of claim 1 in which the water-immiscible organic solvent is methyl isobutyl ketone.

6. The process of claim 1 in which the soluble salt of silicon and the soluble fluoride salt is hydrogen silicohexafluoride ($H_2SiF_6$).

7. The process of claim 1 in which the soluble salt of silicon and the soluble fluoride salt is hydrogen silicohexafluoride ($H_2SiF_6$), and the substantially water-immiscible organic solvent is methyl isobutyl ketone.

8. A process for separating tantalum values from columbium values which comprises providing a solution of said tantalum and columbium values in aqueous hydrofluoric acid; adding to said solution a soluble salt of silicon and soluble fluoride salt in such amount that the molar ratio of the combined tantalum and columbium in the solution, expressed as $Ta_2O_5$ and $Cb_2O_5$, respectively, to the added soluble silicon, expressed as $SiO_2$, is about 3 and the atomic ratio of the fluorine to the silicon in solution is greater than 6; correcting the acidity of the solution to a pH of about 2; contacting the pH-corrected solution with a substantially water-immiscible organic solvent selected from the group consisting of lower aliphatic ketones and lower aliphatic esters, whereby tantalum values are transferred from the aqueous solution to the organic solvent; and separating the pregnant organic solvent from the aqueous solution, thereby separating substantially all of the tantalum values from the columbium values and from other impurities.

9. The process of claim 8 in which the soluble salt of silicon and the soluble fluoride salt are selected from the group consisting of hydrogen silicohexafluoride ($H_2SiF_6$), sodium silicohexafluoride ($Na_2SiF_6$) and potassium silicohexafluoride ($K_2SiF_6$).

10. The process of claim 8 in which the substantially water-immiscible organic solvent is selected from the group consisting of methyl isobutyl ketone, di-isobutyl ketone, butyl formate and propyl acetate.

11. The process of claim 9 in which the substantially water-immiscible organic solvent is selected from the group consisting of methyl isobutyl ketone, di-isobutyl ketone, butyl formate and propyl acetate.

12. The process of claim 8 in which the water-immiscible organic solvent is methyl isobutyl ketone.

13. The process of claim 8 in which the soluble salt of silicon and the soluble fluoride salt is hydrogen silicohexafluoride ($H_2SiF_6$).

14. The process of claim 8 in which the soluble salt of silicon and the soluble fluoride salt is hydrogen silicohexafluoride ($H_2SiF_6$), and the substantially water-immiscible organic solvent is methyl isobutyl ketone.

References Cited in the file of this patent

UNITED STATES PATENTS

| 2,871,092 | Wilhelm et al. | Jan. 27, 1959 |
| 2,886,408 | Stahl | May 12, 1959 |